3,342,754
PARA-XYLYLENE POLYMERS
William F. Gorham, Berkeley Heights, N.J., assignor to Union Carbide Corporation, a corporation of New York
No Drawing. Filed Feb. 18, 1966, Ser. No. 528,413
23 Claims. (Cl. 260—2)

This application is a continuation-in-part of my earlier application Serial No. 50,602 filed Aug. 19, 1960, now abandoned which was a continuation-in-part of my earlier applications Ser. Nos. 622,248 and 622,249 filed Nov. 15, 1956, both of which are now abandoned.

This invention relates to novel polymers of paraxylylenes and to a method for producing same. More particularly, this invention relates to homopolymers of p-xylylenes made by pyrolyzing a di-p-xylylene and condensing the diradical formed by the pyrolysis.

It is known that various poly-p-xylylenes can be prepared by a pyrolytic polymerization of p-xylene and substituted derivatives thereof. This process, first disclosed by M. Szwarc, Disc. Faraday Society 2, 46 (1947), termed the Szwarc process, basically consists of a high temperature pyrolysis (800–1000° C. at subatmospheric pressures) of the starting p-xylene followed by cooling the pyrolysis vapors to a polymerization temperature, such as by condensing the vapors on the cold surface. Upon cooling and condensation, the reactive diradical formed in the pyrolysis instantly polymerizes and forms a polymeric film on the cool surface. However, the high operating temperature of this process and the exceptionally low yield of polymer (about 10–12 percent of theoretical) left much to be desired for commercial applications.

For instance, in this process, operating temperatures of 800° C.–1000° C. were found to cleave off hydrogen or other substituent groups on the para-xylene and produced cross-linked polymers because of the instability at such temperatures of such substituent groups and thus such a procedure completely fails in the preparation of any linear para-xylylene polymer.

In addition this high operating temperature, even with unsubstituted para-xylene, was found to char the monomer (i.e., the p-xylylene diradical) to such an extent that off-color, undesirable polymers resulted. With substituted polymers, charring becomes so severe that it cannot be tolerated.

Thus, the polymer of this process is of such non-uniform quality and is also so generally cross-linked and insoluble in low-boiling solvents as to limit its use even when of acceptable quality. Such polymers are generally only soluble with difficulty in certain few high boiling solvents.

Kaufman, Mark & Mesrobian (J. Pol. Sci., 13, 3 (1954)) investigating the polymer, concluded that the polymer was extensively cross-linked and was not the linear polymer that Szwarc presumed it to be. They also observed that the presence of oxygen substantially decreases the time needed for dissolution of the polymer in high boiling solvents, by slowly breaking the cross-linking of the polymer. For example, the polymer dissolved in benzyl benzoate (at 323° C.) in 35.0 minutes in a nitrogen atmosphere as compared to only 2.4 minutes in an oxygen atmosphere. It is therefore concluded that the high temperature pyrolysis of Szwarc's process dehydrogenated the aromatic ring of the p-xylylene to such an extent that condensation, cross-linking and/or chain branching between individual polymer molecules resulted. Subsequent thermal treatment in the presence of solvent and oxygen thus was able to significantly degrade the polymer or to accelerate the rupture of the cross-linking to make it soluble.

Further observations by other researchers in this field also concluded that the poly-p-xylylenes made by the high temperature pyrolysis are truly cross-linked. Auspos et al., J. Polymer Science 1955, 15, pg. 9 and 15 set forth a number of observations of the poly-p-xylylenes which led them to conclude that the polymer was significantly cross-linked as well as being highly crystalline in nature. This combination of factors has been frequently attributed as imparting significant intractability of the polymer. Errede et al., Quarterly Reviews the Chemical Society, London, 1958, vol. XII, No. 4, pg. 301–320, concluded that from the evidence at hand, the polymer is cross-linked in addition to being crystalline and which contributes to its intractability, and the non-solubility of the polymer until the temperature of the solution approaches that of the crystalline melting point.

The most probable explanation of the cross-linking reaction is by radical addition at sites of hydrogen abstraction from the aromatic nuclei, this reaction being fostered by the high pyrolyzing temperatures employed.

The polymeric p-xylylenes of the Szwarc process thus are not true linear polymers as is desirable for most thermoplastic polymeric applications and the need for a suitable method for producing a truly linear, solvent-soluble substituted para-xylylene polymers of suitable color, free of cross-linking and in a respectable yield for commercial application remained to be found.

Attempts to prepare polymers by other techniques have also been attempted as exemplified by Schaefgen, Journal Polymer Science, vol. 15, pgs. 203–219 (1955) wherein related compounds such as cyclic di-p-xylylene and linear di-p-xylylene were pyrolyzed in an attempt to secure the poly-p-xylylene free of cross-linking. Such efforts however led only to the preparation of very low amounts, i.e., less than 5 percent, of highly fluorescent polymers. Such polymers have not only been found to be of inferior physical properties but also are highly unsaturated as to be essentially stilbene polymers and not linear saturated poly-p-xylylenes.

According to the present invention, it has now been discovered that truly linear homopolymers of p-xylylenes are produced in nearly quantitative yield by heating a cyclo-di-p-xylylene having up to about 6 aromatic nuclear substituent groups to a temperature between about 450° C. and 700° C. for a time sufficient to cleave substantially all of the di-p-xylylene into vaporous p-xylylene diradicals but insufficient to further degrade the said diradicals and at a pressure such that the partial pressure of the vaporous p-xylylene diradicals is below 1.0 mm. Hg and preferably below 0.75 mm. Hg, and cooling the vaporous diradicals to a temperature below 200° C. and below the ceiling condensation temperature of only one p-xylylene diradical specie present in the pyrolysis vapors. Condensation of this specific diradical yields the tough, linear, non-fluorescent homopolymers of this invention.

In this process, the diradical polymerizes nearly instantaneously at the condensation temperature of the diradical. The coupling of these diradicals into polymers involves such low activation energy and the chain propagation shows little or no preference as to the particular diradical, that steric and electronic effects are not important as they are in vinyl polymerization. Thus these homopolymers can be made by cooling the vaporous diradicals down to any temperature below the condensation temperature of the particular diradical specie involved. It has been observed that for each diradical species, there is a definite ceiling condensation temperature above which the diradical will not condense and polymerize. All observed ceilings have been below 200° C. but vary to some degree upon the operating pressure involved. For example, at 0.5 mm. Hg pressure, the following condensation and polymerization ceilings are observed for the following diradicals.

| | °C. |
|---|---|
| p-Xylylene | 25–30 |
| Chloro-p-xylylene | 70–80 |
| Ethyl-p-xylylene | 70–80 |
| N-butyl-p-xylylene | 130–140 |
| Bromo-p-xylylene | 130–140 |
| Acetyl-p-xylylene | 130–140 |
| Carbomethoxy-p-xylylene | 130–140 |
| Dichloro-p-xylylene | 130–140 |

Thus, by this process, homopolymers are made by keeping the condensation and polymerization zone at a temperature below the ceiling condensation temperature of only one diradical specie involved or desired in the homopolymer. This is most appropriately termed "homopolymerizing conditions."

Inasmuch as the coupling of these reactive diradicals does not involve the aromatic ring, and the nuclear substituents do not become involved in nor affect the chain propagation, any unsubstituted or nuclear substituted p-xylylene polymer can be prepared since the substituent groups function essentially as inert groups. Thus, the substituent group can be any organic or inorganic group which can normally be found or substituted on aromatic nuclei. As an illustration of such substituent groups are hydrocarbons, oxyhydrocarbons, thiohydrocarbons, hydroxyl, halogen, nitro, nitrile, amine, mercapto, and like groups as is illustrated by such groups as methyl, ethyl, propyl, butyl, hexyl, alkenyls like vinyl, aryls for example phenyl, naphthyl, substituted phenyl such as halophenyl, alkylphenyl groups, as well as alkoxy groups like methoxy, ethoxy, propoxy, etc., hydroxyalkyl groups such as hydroxymethyl, hydroxyethyl and the like, carboxyl, carboxylalkyl such as carbomethoxy, carboethoxy and the like, acyl groups such as acetyl, propionyl, butyryl and the like as well as cyanoalkyl groups, and similar organic radicals as well as the above recited inorganic groups and halogens such as chlorine, bromine, fluorine and iodine. However, such listing is not exhaustive of substituent groups but is only illustrative of the broad scope of this invention.

Particularly preferred of the substituted groups are those simple hydrocarbon groups such as the lower alkyls as methyl, ethyl, propyl, butyl, hexyl, lower aryl hydrocarbons such as phenyl, alkylated phenyl, naphthyl, alicyclic groups such as cyclohexyl, aralkyl groups such as benzyl, and like groups having no more than about 10 carbon atoms, and the halogen groups particularly chlorine and bromine.

It is of course within the scope of this invention to prepare homopolymers of the unsubstituted p-xylylene diradical as well as of any substituted p-xylylene diradical by cooling the diradical to a temperature below its ceiling condensation temperature. It is not critically necessary that there be only one p-xylylene species present in the operation of this process.

Where several different diradicals exist in the pyrolyzed mixture and two or more have essentially the same vapor pressure and condensation characteristics, as for example, bromo-p-xylylene and acetyl-p-xylylene, homopolymers cannot be made inasmuch as the coupling mechanism is not specific to particular substituted species and random copolymers of the several species will result.

However where several different diradicals existing in the pyrolyzed mixture have different vapor pressure and condensation characteristics, as for example bromo-p-xylylene and chloro-p-xylylene, homopolymerization will result when the condensation and polymerization temperature is selected to be at or below that temperature where only one of the diradicals condense and polymerize. Thus, for purposes within this application, the terms "under homopolymerization conditions" are intended to include those conditions where only homopolymers are formed. Therefore it is completely within the scope of this invention to make homopolymers from a mixture containing one or more of the substituted diradicals when any other diradicals present have different condensation or vapor pressure characteristics, and wherein only one diradical specie is condensed and polymerized in only one polymerization zone. Of course other diradical species not condensed in this zone can be passed through said zone in vaporous form to be condensed and polymerized in a subsequent polymerization zone.

In this process the p-xylylene diradical is prepared by the pyrolytic cleaving of at least one cyclic di-p-xylylene represented by the basic structure

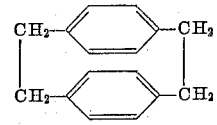

which may have as many as six aromatic nuclear substituents. Pyrolytic cleaving of this cyclic dimer results in a splitting of the dimer into two reactive diradicals, which share the total number of substituents if such are present, and each of which is represented by the basic structure

Where there are no nuclear substituents or where there are an even number, e.g., 2, 4 or 6, on the di-p-xylylene, two molecules of the same diradical are cleaved. However, where an odd number of substituents are present, e.g., 1, 3 or 5, two different diradicals result from the pyrolysis of only one di-p-xylylene. In such a case, the diradicals should have different condensation temperatures in order to prepare homopolymers.

This feature provides a very desirable advantage in this process in that each of the diradicals present in the vaporous mixture does not have to be polymerized in the same polymer produced in this process. Thus it is possible by careful control of the condensation temperature to exclude, if desired, any lower boiling diradicals than the one desired in the homopolymer. For example, in the case of the pyrolysis of bromo-di-p-xylylene and dichloror-di-p-xylylene, three reactive diradicals are produced; p-xylylene, bromo-p-xylylene, and chloro-p-xylylene in a respective molar ratio of 1:1:2. Condensation of the mixture at about 140–150° C. at 1 mm. Hg will yield a homopolymer of bromo-p-xylylene and with the chloro-p-xylylene and p-xylylene diradicals passing through the polymerization zone as uncondensed vapors. By lowering the condensation temperature of the next polymerization zone to 70°–80° C., a homopolymer of chloro-p-xylylene can be secured with the p-xylylene diradicals passing through this zone, and which can be separately homopolymerized in a room temperature zone.

Inasmuch as p-xylylene diradicals are condensed at a temperature about 25°–30° C., which is much lower than any of the substituted p-xylylene diradicals, it is within the scope of this invention to have present such diradicals in the vaporous pyrolyzed mixture with any of the other substituted diradicals of this invention. In such a case, homopolymerizing conditions are secured by maintaining the initial polymerization zone at a temperature below the ceiling condensation temperature of the substituted p-xylylene but above that of the p-xylylene, thus permitting the p-xylylene vapors to pass through the initial polymerization zone without condensing and polymerizing but collecting the poly-p-xylylene in a subsequent polymerization zone.

This same technique can of course be practiced with any of the mixture of two or more different diradicals having different ceiling condensation temperatures. Thus, it is within the scope of this invention to prepare, if desired, more than one homopolymer by providing a plurality of polymerization zones, one for each diradical specie, and each zone being maintained at a temperature below the ceiling condensation temperature of a particular diradical specie but above the ceiling condensation temperature of all other diradical species present in the vaporous mixture.

The cyclic dimer, di-p-xylylene, or the substituted dimers can be used in this process. The substituted dimers can be readily prepared from the di-p-xylylene by appropriate treatment for introduction of the substituted groups. Thus, halogenation, alkylation, acetylation, nitration, amination, cyanolation, and like methods for the introduction of such substituent groups as can normally be substituted on aromatic nuclei, inasmuch as the cyclic dimer is a very stable product even at temperatures as high as 400° C. Thus, nearly any elevated temperature reaction can be employed for the preparation of various substituted di-p-xylylenes. Illustratory preparation of several substituted di-p-xylylenes is shown in the following examples.

In this process, the reactive diradicals are prepared by pyrolyzing one or more of the di-para-xylylenes at a temperature less than about 700° C., and preferably at a temperature between about 550° C. to about 600° C. At such temperatures, essentially quantitative yields of the reactive diradical are secured. Pyrolysis of the starting di-p-xylylene begins at about 450° C. regardless of the pressure employed. Operation in the range of 450°–550° C. serves only to increase time of reaction and lessen the yield of polymer secured. At temperatures above about 700° C., cleavage of the substituent group can occur, resulting in a tri/or poly-functional species causing cross-linking of highly branched polymers.

Pyrolysis temperature is nearly independent of the system operating pressure. It is however preferred that reduced or subatmospheric system pressures be employed. For most operations, system pressure within the range of 0.0001 to 10 mm. Hg is most practical. However if desired, greater pressures can be employed by using inert vaporous diluents such as nitrogen, argon, carbon dioxide, steam and the like which can either vary the optimum temperature of operation or change the total effective pressure in the system. In fact essentially quantitative yields of clear, tough linear poly-p-xylylene is secured at system pressures up to atmospheric as long as the diradical partial pressure is maintained below 1.0 mm. pressure.

Polymer quality is dependent on diradical partial pressure in the condensation zone. Deposition at or above 1.0 mm. partial pressure has been found to yield yellow, highly fluorescent polymers with impaired physical properties containing stilbene moieties and/or substantial cross-linking. As the partial pressure is reduced below 1.0 mm., polymer quality as measured by color, transparency and fluorescence is remarkably improved. At a pressure of 0.75 mm. the polymer is free of fluorescence and acceptable in quality although slightly yellow whereas at a pressure of 0.5 mm. or less the quality is excellent with no color or fluorescence, and is strong and flexible.

Because of such pressure sensitivity, common U-tube mercury manometers, which are virtually impossible to read with accuracy below 1.0 mm. are recommended only for indicating system pressure. Even though the diradical is a condensible gas, thermocouple gauges for measuring the partial pressures can be used and are recommended, if heated to prevent deposition of polymer on the filaments. Preferably, though not always necessary, the heated thermocouple gauge can be calibrated against a McCleod gauge to relate the true partial pressure of the p-xylylene diradicals.

The homopolymers of this invention are readily recovered from the condensation polymerization zone by any convenient means, depending on the particular zone employed. Where a cold surface such as a condenser is employed as the polymerization zone, the polymer can be removed from the wall of the zone by mechanically stripping or dissolving it off with a solvent. Condensation of the diradical in a water spray or under the surface of an aqueous medium recovers the polymer in particulate form, which can then be separated by filtration and drying by conventional means prior to fabrication. It is not to be implied that the polymers of this invention have to be removed or recovered from the depositing surface since the most practical of all applications is to have the surface or substrate to be coated and protected within or as a part of the polymerization zone. Small articles can be protected or encapsulated with these polymers or planar or irregular substrates of any sort can be coated, with or without masking, for securing the insulative and protective properties of the poly-p-xylylene of this invention. Deposition of the polymer on continuously moving surfaces of paper, metal foils, fabrics and the like can readily be accomplished within the deposition zone by appropriate design.

In all of the appended examples, partial pressure of the p-xylylene diradicals was below 0.75 mm. and in most instances below 0.5 mm. Hg pressure. These examples are illustrative of this invention and should not be interpreted as a limitation thereof. Unless otherwise noted, all parts are in parts by weight.

EXAMPLE I

*Homopolymer of chloro-p-xylylene*

Dichloro-di-p-xylylene was prepared by mixing 10.4 grams of di-p-xylylene with 500 ml. of carbon tetrachloride, and 0.1 gram of iron powder was placed in a one-liter, 3-neck flask equipped with stirrer, drying tube and gas inlet tube. The flask was cooled in a water bath. A total of 7.1 grams of chlorine was bubbled into the stirred suspension through the gas inlet tube over a 30-minute period. The reaction was completed at the end of one hour, as evidenced by the disappearance of the characteristic chlorine color in the solution. The product was purified by vacuum distillation, and amounted to 14 grams or 99 percent yield. This material, melting at 160° C. to 170° C., gave an analysis of 25.0 percent chlorine, matching the theoretical value of 25.0 percent. Its formula is:

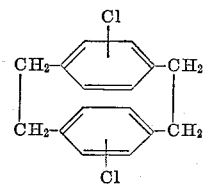

Polymerization using this material was carried out in a 25 millimeter diameter Pyrex glass tubing with a 12 inch pyrolysis zone maintained at a temperature of 550° C.–600° C., and a 10-inch polymerization zone immediately following maintained at about room temperature (20°–30° C.) by air cooling. The dichloro-di-p-xylylene (3.0 gms.) was vaporized in a distillation apparatus at a system pressure of 1 mm. Hg and the vapors passed into the pyrolysis zone at 600° C. over a 10-minute period, to give 3.0 grams (100% yield) of poly-chloro-p-xylylene as a film in the polymerization zone. The polymer was collected from the walls of the air cooled section of the tube by stripping it off after which it was extracted with several portions of chloroform to remove, if present, any condensed but unpolymerized dimer.

The homopolymer product had a melting point of 275° C.–280° C. and analyzed at 25 percent by weight chlorine (compared to a theoretical 25 percent chlorine). It was soluble in boiling alpha methyl naphthalene. The polymer can be represented by the structural formula:

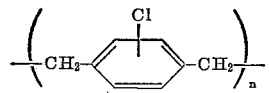

where $n$ indicates the number of repeating units in the polymer.

EXAMPLE II

Homopolymer of bromo-p-xylylene

A mixture consisting of 5 grams of di-p-xylylene, 0.1 gram of iron powder and 400 ml. of carbon tetrachloride was placed in a 500-ml., 3-neck flask, equipped with a reflux condenser, stirrer and addition funnel. A solution of 10 grams of bromine in 50 ml. of carbon tetrachloride was added dropwise from this addition funnel to the stirred suspension over a 30 minute period. The reaction mixture was stirred at 10° C. to 20° C. for 12 hours. The catalyst was filtered off, and the solution concentrated to 30 ml. by distillation. Upon cooling, di-bromo-di-p-xylylene crystallized from solution. The material was separated by filtration, and purified by sublimation. A total of 3.3 grams equivalent to 37 percent yield was obtained. The material had a melting piint of 240° C.–242° C. The material analyzed for 43.5 percent bromine, as compared with the theoretical value of 43.7 percent for di-bromo-di-p-xylylene. Its formula can be expressed as:

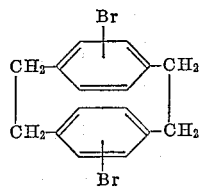

The pyrolysis and polymerization was conducted in the 25 mm. Pyrex glass tube as described in Example I. The compound was vaporized and passed through the 12-inch pyrolysis section of the tubing, which was maintained at a temperature of 550° C. to 600° C. Polymerizatiin occurred on the air-cooled section of the tubing immediately following the pyrolysis zone. Two such pyrolyses were conducted.

In the first one, 0.6 gram of the compound was pyrolyzed at 550° C. and 0.5 to 1 mm. system pressure, over a period of 20 minutes. The translucent polymer film was removed, mechanically, extracted with chloroform and dried. A total of 0.52 gram (87 percent) of a polymer having a melting point of 250° C. to 255° C. was obtained. Analysis indicated 43.4 percent bromine, compared with a theoretical value of 43.7 percent.

In another experiment, 5.1 grams of the compound were pyrolyzed at 575° C. and 1 mm. system pressure over a 60-minute period. 4.6 grams of the same polymer were obtained for a yield of 90 percent.

This thermoplastic polymer, poly-bromo-p-xylylene, was opaque to translucent in appearance. It is substantially insoluble in all common organic solvents except for solubility in high boiling solvents such as chloronaphthalene, alpha methyl naphthalene and alpha bromo naphthalene. It can be solvent cast into clear tough films from such solutions or can be drawn into fibers. It is particularly desirable for such applications because of its orientability, its high melting point (250°–255° C.) and its self extinguishing features.

EXAMPLE III

Using the same technique as described in Example I, there was prepared the tetrachloro-di-p-xylylene of the formula:

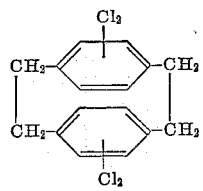

and hexachloro-di-p-xylylene of the formula:

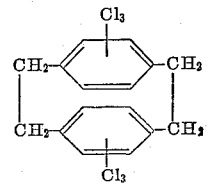

The above two dimers were each subjected to pyrolysis at 570° C. wtih the polymerization zone maintained at 130° C. to form the corresponding halogenated poly-p-xylylene. The tetrachloro-di-p-xylylene formed the polydichloro-p-xylylene having a melting point of 310° C. to 330° C. and represented by the structural formula:

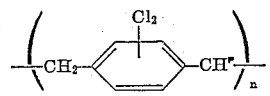

where $n$ indicates the number of units in the chain and the hexachloro-di-p-xylylene formed the polytrichloro-p-xylylene having a melting point of 310° C. to 330° C. and represented by the structural formula:

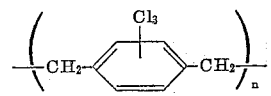

EXAMPLE IV

Homopolymer of acetyl-p-xylylene 2-acetyl-di-p-xylylene was prepared according to the method described by Cram and Allinger (J. Am. Chem. Soc., vol. 77, 6289) by the low temperature (−20° C.), Friedel-Crafts acetylation with acetyl chloride of di-p-xylylene as follows:

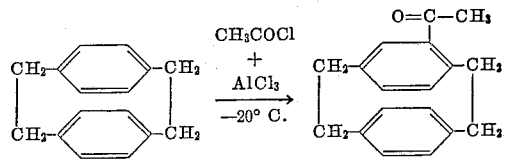

0.8 gram of 2-acetyl-di-p-xylylene was pyrolyzed at a steady rate at 570° C. to 580° C. and 0.4 mm. pressure during a 7 minute period. The reactive diradicals formed upon pyrolysis in a 17-millimeter diameter Pyrex tube having an 18-inch pyrolysis zone, a 15-inch polymerization zone heated to 80° C., and a second polymerization zone maintained at room temperature (25° C. to 30° C.). This reaction resulted in the cleavage of the compound to 2-acetyl-p-xylylene and p-xylylene. A first polymer formed in the initial 6 inches of the first polymerization zone. The following 9 inches of this zone were free of polymer, but a second polymer formed in the second polymerization zone air cooled to about 30° C. The first polymer was extracted with ether, and after drying weighed 0.33 gram. Its appearance is that of an opaque film which exhibits a crystalline transition point of 190° C. to 195° C. Once melted, it recrystallized on cooling to temperatures below 70° C. This polymer is swelled by boiling chloroform, and dissolves in hot alpha chloro naphthalene, in which its reduced viscosity at 100° C. is 1.7. The infra-red spectrum of the polymer indicated that it was poly-acetal-p-xylylene. The spectrum exhibited a very strong carbonyl band at 5.9μ. It also exhibited a strong band at 11.28μ, that is indicative at a 1,2,4-tri substituted benzene. In addition, the spectrum displayed strong bands at 7.4, 8.8, 8.45, 9.0, 9.38 and 10.5μ which are not found in the spectrum of poly-p-xylylene.

The second polymer weighed 0.3 gram crude, and after extraction with boiling chloroform for one hour, and drying, yielded 0.23 gram of material. This material had a melting point above 330° C., was insoluble in boiling chloroform, and was identified by the infra-red spectrum as poly-p-xylylene.

The reactions above discussed may be summarized as follows:

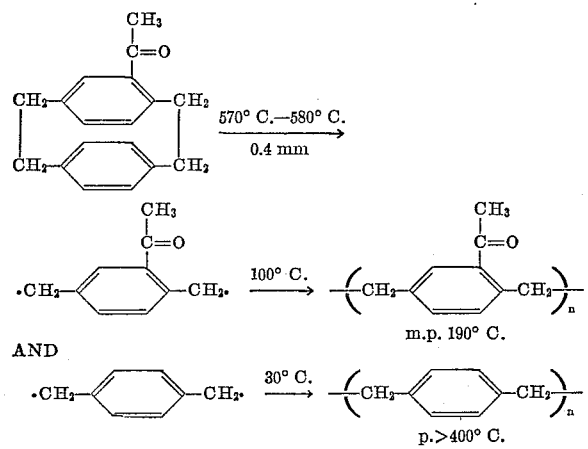

Availability of the acyl-di-p-xylylene is important to the preparation of further polymeric forms, since conversion of the acyl group to carboxyl, amine and other groups is readily accomplished by conventional organic reactions, as will be shown hereinafter. Pyrolysis of the thus prepared substituted di-p-xylylene yields a large number of poly-p-xylylenes having different properties, said properties often varying, depending upon the substituent group of the di-p-xylylene.

EXAMPLE V

*Homopolymer of carbomethoxy-p-xylylene*

2-acetyl-di-p-xylylene was converted to 2-carboxy-di-p-xylylene by method of Cram and Allinger supra. The methyl ester was prepared by esterification techniques with methanol by the following technique.

In a 100-ml. one-neck flask was placed 1.3 gram of carboxy-di-p-xylylene, 40 ml. of methanol, and 2 ml. of concentrated sulfuric acid. The contents were heated to reflux for five hours and the solution concentrated to 20 ml. by distillation. On cooling, a product crystallized from solution and was isolated by filtration. A total of 1.0 gram of the crude ester, melting point 135° C.–145° C., was obtained. The crude product was dissolved in 100 ml. of chloroform and the chloroform solution washed with 100 ml. of 2 percent sodium hydroxide solution to remove any unesterified acid. The chloroform solution was dried over magnesium sulfate and the solvent removed by evaporation. A total of 0.8 gram (60 percent yield) of 2-carbomethoxy-di-p-xylylene, melting point 135° C.–138° C. was obtained in this fashion having the structure:

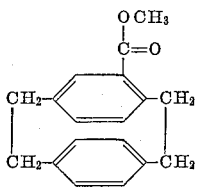

Polymerization of the compound was effected by vaporizing 0.8 gram of the compound over five minutes through a pyrolysis chamber kept at 580° C. under 0.2-mm. pressure. The reactive diradicals thus produced, carbomethoxy-p-xylylene and p-xylylene, were led into a 16 inch length of Pyrex glass tubing maintained at 110° C. Part of the diradicals polymerized in the initial 6 inch length of this tubing to form 0.31 gram of a first polymer. The polymer was recovered in the manner described in Example I. This polymer had a crystalline transition temperature of 200° C. to 210° C., and could be oriented by stretching at room temperature. While opaque upon mechanical recovery from the tubing and extraction with ether, strips of this material turn transparent and melted upon reaching a temperature of 200° C. to 210° C. Its infra-red spectrum exhibited a very strong band at 5.8μ indicative of the ester carbonyl group and several strong bands in the 7 to 15μ region which are not found in the spectrum of poly-p-xylylene. It was ascertained that this polymer was poly-carbomethoxy-p-xylylene.

The second polymer was recovered from the final 10 inch section of tubing maintained at room temperature and recovered as above. It was pure homopolymeric poly-p-xylylene having a melting point of 400° C.

The transformations above described are indicated below:

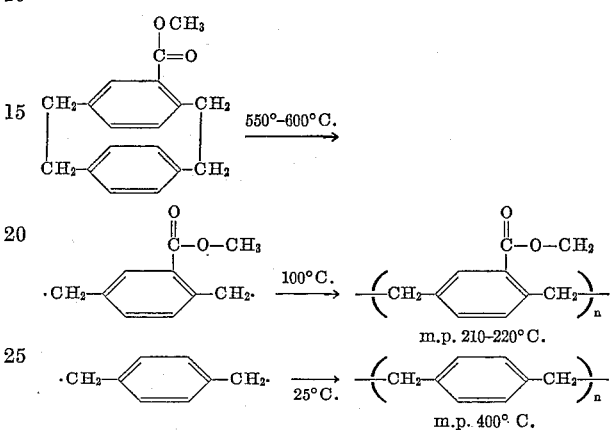

With the use of a tubular polymerization zone system, isolation of each polymeric species is simple. In each case the different polymeric species form as separate tubular films on separate sections of the polymerization tube. Thus by this process it is possible to produce separate homopolymers from a mixture of two or more reactive diradicals by having separate polymerization zones maintained at different temperatures depending upon the condensation temperature of each of the separate diradicals present.

It is likewise possible in this process to control the molecular weight of the various substituted polymers. The following examples illustrate how the molecular weight of various poly-p-xylylenes may be controlled by controlling the temperature of polymerization of the first obtained diradical. In essence, this technique is based upon the discovery that the reduced viscosity, and therefore the molecular weight of the final substituted p-xylylene polymer, depends to some degree upon the temperature of polymerization of the specific diradical. It has been found that polymerization of the 2-bromo-p-xylylene for example at room temperature, yields a polymer which is slowly soluble in boiling alpha methyl naphthalene. Polymerization of the same diradical at 135° C., however, yields another polymer immediately soluble in boiling alpha methyl naphthalene, and having a reduced viscosity of 0.67 in this solvent at 160° C. Moreover, polymerization of the same diradical at 170° C. yields a lower molecular weight polymer soluble in alpha methyl naphthalene at 180° C., and having a reduced viscosity of 0.30 in this solvent at 180° C.

The same type of molecular weight control occurs in the pyrolysis polymerization of other substituted poly-p-xylylenes. In the case dichloro-di-p-xylylene, pyrolysis and subsequent polymerization at 135° C. yields poly-2-chloro-p-xylylene, which has a reduced viscosity of 2.0. Polymerization of the same compound at 170° C. yields a lower molecular weight polymer having a reduced viscosity of 1.4 at 200° C. However regardless of ease of solubility and/or reduced viscosity, these polymers are all truly linear and free of cross-linking.

In the Examples VI, VII, VIII, and IX, polymerization was carried out as indicated in Examples I and II, but with the following exception. The section of 17 mm. tubing immediately following the pyrolysis zone was maintained at 130° C. or 170° C. by a second combustion furnace. The polymerization zone thus provided was usually 12 to 15 inches in length.

EXAMPLE VI

*Polymerization of 2-bromo-p-xylylene at 130° C.*

1.5 grams of di-bromo-di-p-xylylene were sublimed at a steady rate over a 30-minute period through an 8-inch pyrolysis zone heated to 580° C. The monomer was then polymerized on the 12-inch polymerization section of the tube immediately following the pyrolysis zone. The polymerization zone was maintained at 130° C., and the pressure of the system kept at 0.4 mm. The polymer was mechanically removed, extracted with boiling chloroform and dried. A total of 0.92 gram of insoluble polymer melting at 250° C.–258° C. was obtained. The polymer, poly-bromo-p-xylylene, was immediately soluble in boiling alpha methyl naphthalene and remained in solution at temperatures as low as 100° C. This polymer had a reduced viscosity of 0.67 in this solvent at 158° C.

EXAMPLE VII

*Polymerization of 2-bromo-p-xylylene at 170° C.*

1.4 grams of dibromo-di-p-xylylene were pyrolyzed at 590° C. and 0.3 mm. pressure by steady sublimation of the material through the zone over a 15-minute period. The polymerization was conducted in a 15-inch polymerization zone maintained at 170° C. The formed polymer was mechanically removed, extracted with boiling chloroform and dried. 0.6 gram of a polymer melting at 250° C. to 258° C. was obtained. This polymer, still poly-bromo-p-xylylene, had a reduced viscosity of 0.30 in alpha methyl naphthalene at 120° C. It was soluble in this solvent at temperatures as low as 60° C.

EXAMPLE VIII

*Polymerization of 2-chloro-p-xylylene at 130° C.*

Four grams of dichloro-di-p-xylylene were distilled at steady rate through a 12-inch pyrolysis zone at 600° C. under 1-mm. pressure over a 35-minute period. Polymerization occurred in the 15-inch polymerization zone immediately following the pyrolysis zone and set at 130° C. The formed polymer, poly-chloro-p-xylylene, was mechanically removed, extracted with boiling chloroform, and dried. It amounted to a total of 1.75 grams of a material melting at 270° C. to 280° C. This material had a reduced viscosity of 2.0 in alpha methyl naphthalene at 158° C.

EXAMPLE IX

*Polymerization of 2-chloro-p-xylylene at 170° C.*

Two grams of dichloro-di-p-xylylene were pyrolyzed in a 12-inch section of tubing at 600° C. and 0.5 mm. pressure by steady sublimation of the material through a pyrolysis zone over a 20-minute period. Polymerization occurred in the 15-inch polymerization zone immediately following the pyrolysis zone and set at 170° C. The polymer was mechanically removed, extracted with boiling chloroform and dried. A total of 0.6 gram of poly-chloro-p-xylylene melting at 270° C. to 280° C. was obtained. This material, a further form of poly-chloro-p-xylylene, had a reduced viscosity of 1.4 in alpha methyl naphthalene at 200° C.

This thermal type of molecular weight control can be achieved with the organic substituted p-xylylenes by varying the control of the condensation and polymerization temperature. In all cases, it is necessary only that the polymerization temperature be kept below 200° C. and below the condensation temperature of the particular diradical employed. In instances where homopolymers are desired and two different diradicals are present in the pyrolyzed mixture, such as occurs where a mono substituted di-p-xylylene is used as the starting material, the temperature selected should be such that only one diradical condenses in any one particular polymerization zone, otherwise copolymers of the two diradicals will result.

EXAMPLE X

*Preparation of poly-ethyl-p-xylylene*

2-ethyl-di-p-xylylene was prepared by the reduction involving a reaction between 3.8 grams of acetyl-di-p-xylylene, 30 ml. of glacial acetic acid, 30 ml. of concentrated hydrochloric acid with 12 grams of amalgamated zinc. The above mixture was refluxed, and at the end of an hour, 30 ml. each of glacial acetic acid and concentrated hydrochloric acid were added. After a short time the solution became red, then turned colorless, and later an oil separated. In all, the mixture was refluxed 5 hours. The mixture was cooled, diluted with 200 ml. of water and extracted with 150 cc. of benzene. The benzene layer was washed with water, concentrated and dried. The product was purified by vacuum distillation. It amounted to 2.3 grams (65 percent yield) of 2-ethyl-di-p-xylylene having a melting point of 100° C. to 108° C. and a boiling point of 160° C. to 180° C. (0.3 mm). One gram of the above product was distilled over four minutes through a pyrolysis chamber kept at 575° C. and 0.3 mm.

Pyrolysis of this at 575° C. resulted in cleavage to p-xylylene and 2-ethyl-p-xylylene diradicals. The 2-ethyl-p-xylylene diradicals polymerized in a polymerization zone maintained at 90° C. to give 0.55 gram of poly-ethyl-p-xylylene having a melting point of about 180° C. Poly-ethyl-p-xylylene dissolved in tetrachloroethane at room temperature and gave clear films when cast from solution. Its reduced viscosity was 5.6. The p-xylylene diradical polymerized in the final zone, which was air cooled to 30° C. to form poly-p-xylylene having a melting point above 330° C.

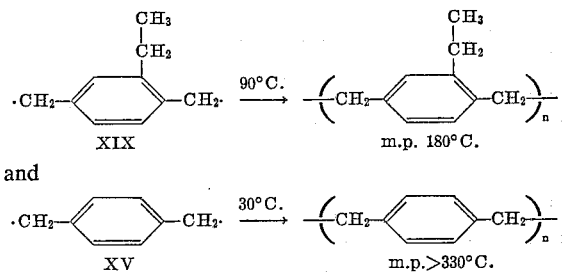

In this example, when both polymerization zones were maintained at 30° C. or below, a copolymer having repeating units of 2-ethyl-p-xylylene and p-xylylene in about a 1:1 molar ratio is produced.

Other methods of molecular weight control can be achieved in this process, such as by chemical means. Free-radical chain transfer agents such as for example β-naphthyl mercaptan can be employed for such control as shown in the following example.

EXAMPLE XI

*Example of free-radical agents*

Mixtures of β-naphthyl mercaptan and dichloro-di-p-xylylene were pyrolyzed at 600° C. and 0.3 mm. pressure. The pyrolyzed gaseous mixture of 2-chloro-p-xylylene and β-naphthyl mercaptan was condensed on a surface maintained at 80° C. The effect of β-naphthyl mercaptan on the R.V. of the poly (chloro-p-xylylene) as measured in α-methyl naphthalene was found as follows:

| Percent BNM in charge: | R.V. of polymer |
|---|---|
| 0 | 4.25 |
| 1.0% | 0.92 |
| 2.0% | 0.77 |

It is to be understood that other typical free-radical chain transfer agents can be employed with similar results in the practice of this invention. Among such typical agents which bear special mention are phenols, halogenated hydrocarbons, aliphatic ketones, aliphatic and aromatic mercaptans, triphenyl methanes, trans-stilbene and the like.

For example, trans-stilbene reduced the reduced viscosity of the polymer from 1.31 to 0.90 measured in α-chloronaphthalene at 0.2 percent weight concentration, and triphenyl methane reduced the R.V. to 0.99 employed in the same amount as the trans-stilbene.

EXAMPLE XII

*Polymerization of di-p-xylylene*

Poly-p-xylylene was prepared from di-p-xylylene by heating a 1.0 gram sample of di-p-xylylene in a 12-inch section of a 14-mm. I.D. Pyrex glass tube sealed at one end and maintained at 550° C. (system pressure 1–2 mm.) over a 10-minute period. A total of 1 gram of polymer was recovered from the walls of an air cooled part of the glass tube connected to the pyrolysis zone by mechanically stripping the polymer film from the wall of the tube. The polymer was insoluble in chloroform and was characterized by the repeating unit:

The polymer was completely linear and free of crosslinking, even though indicating an infra-red spectrum essentially the same as the polymer prepared by the conventional Szwarc process.

EXAMPLE XIII

*Polymerization of di-p-xylylene*

The reaction was carried out in 25 mm. I.D. Pyrex tubing sealed at one end. A total of 2.0 grams of di-p-xylylene was sublimed at a steady rate over a twenty-five minute period through a 15-inch pyrolysis zone maintained at 620° C. The p-xylylene diradicals polymerized on the air-cooled section of the apparatus following the pyrolysis zone. A total of 1.92 grams of polymer in the form of an opaque, cylindrical film was obtained. This film was totally insoluble in refluxing carbon tetrachloride. The infra-red spectrum of the polymer was identical to the spectrum of poly-p-xylylene obtained via the Szwarc process.

A comparison of the solution properties of poly-p-xylylene prepared from di-p-xylylene and by the Szwarc process from p-xylylene is shown. The Szwarc polymerized poly-p-xylylene was prepared by vacuum pyrolysis of p-xylene at 780° C.–800° C. which was distinctly off-color and of obvious non-uniform quality.

A sample of the Szwarc polymerized p-xylylene was heated to 270° C. in a 32 percent chlorinated biphenyl. After 60 minutes the polymer was swelled, but not dissolved. After 100 minutes at a temperature of 285° C., well over 80 percent of the polymer was still insoluble.

The poly-p-xylylene of this invention dissolved completely in this solvent in from 1 to 5 minutes. It also readily dissolved in α-chloronaphthalene and benzyl benzoate among others. In addition the insoluble poly-p-xylylenes prepared by Szwarc process began to decompose at temperatures of 350° C. and above by cleavage of the carbon-to-carbon bonds of the polymeric chain. At temperature of 380°–400° C. the molecular degradation becomes so severe that low molecular weight products, for instance, toluene, ethyl toluene, p-xylylene, can actually be distilled off from the pyrolyzed resin.

EXAMPLE XIV

In a 500 ml. three-neck flask equipped with stirrer, calcium chloride tube, and stopper was placed 9.5 grams of aluminum chloride, 125 ml. of s-tetrachloroethane, and 8.5 grams of n-butyryl chloride. The mixture was cooled to −30° C. and 7.5 grams of di-p-xylylene added. The solution was stirred at −15° C. to −20° C. for twenty minutes, cooled to −30° C. and 50 ml. of 1 N hydrochloric acid added. The solution was allowed to warm up to room temperature. The mixture was transferred to a separatory funnel, 100 ml. of water added and the aqueous layer containing inorganic salts was extracted from the organic layer. The organic layer was separated, washed with 150 ml. of 3 percent sodium bicarbonate solution, 100 ml. of water and dried. The solvent was removed by distillation and the product purified by vacuum distillation. A total of 6.7 grams (66 percent yield) of 2-butyryl-di-p-xylylene having a boiling point of 160° C.–170° C. at 0.15 mm., and a melting point of 88° C.–93° C., was obtained. The compound exhibited a characteristic infra-red spectrum for 2-butyryl-di-p-xylylene and which was comparable to the spectrum of 2-acetyl-di-p-xylylene. The reaction can be illustrated as follows:

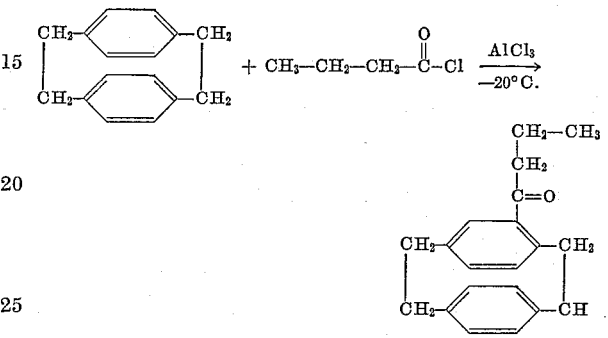

Upon pyrolysis of this dimer at about 550° C.–600° C. in the manner of Example I, diradicals of 2-butyryl-p-xylylene and p-xylylene are formed which condense in the two polymerization zones into poly-butyryl-p-xylylenes and poly-p-xylene according to the following scheme:

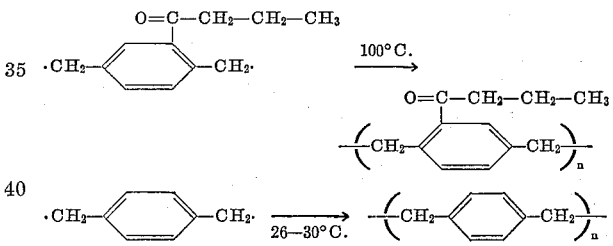

However as with the acetyl di-p-xylylene, the butyryl-di-p-xylylene can be employed as a useful intermediate to other substituent groups, as for example, by reduction to butyl-di-p-xylylene as follows:

In a 250-ml. flask was placed 10 grams of amalgamated zinc, 125 ml. of glacial acetic acid, 15 ml. of concentrated hydrochloric acid, and 5 grams of 2-butyryl-di-xylylene. The solution was heated to reflux for two days. The solution was intermittently resaturated with anhydrous hydrogen chloride. At the end of this period the hot solution was transferred to a flask containing a new 10-gram portion of amalgamated zinc. The reduction process was repeated for an additional 24 hours. The mixture was transferred to a separatory funnel and the product extracted into benzene. The benzene layer was washed and dried. The benzene was removed by atmospheric distillation and the product purified by vacuum distillation. A total of 1.16 grams of n-butyl-di-p-xylylene, having a boiling point of 150° C. at 0.1 mm., and a melting point of 65° C.–68° C. was obtained. The reaction being represented by the following scheme:

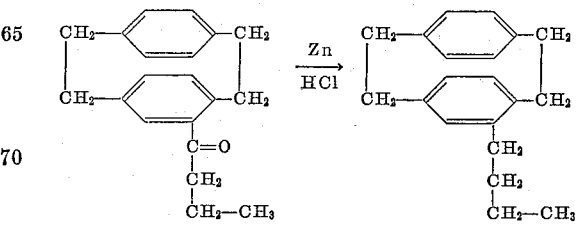

Upon pyrolysis of this dimer, diradicals of 2-butyl-p-xylylene and p-xylylene are formed which condense into poly-butyl-p-xylylene and poly-p-xylylene according to the following scheme:

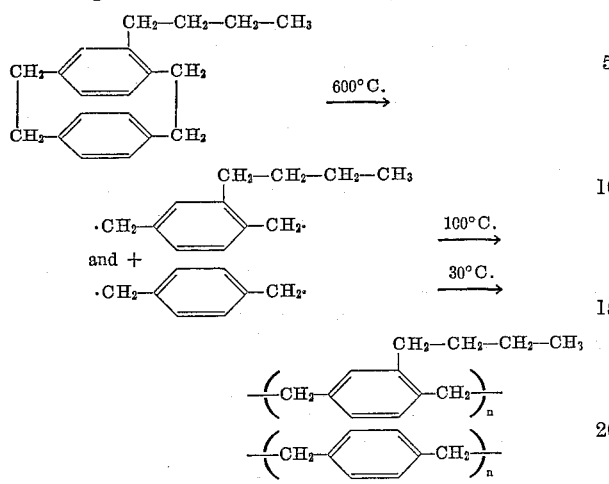

The reaction was carried out in 17 mm. Pyrex tubing. An eighteen-inch pyrolysis zone and a fifteen inch polymerization zone were employed. A total of 1.0 gram of n-butyl-di-p-xylylene was pyrolyzed at a steady rate at 600° C. pressure by distillation through the pyrolysis tube over a sixteen minute period. A transparent polymeric film formed in the initial polymerization zone which was maintained at 100° C. The polymer was removed mechanically at the end of the run and extracted with ether. The polymer was soluble in chloroform without heating and exhibited a R.V. of 2.5 in this solvent at 25° C. This polymer, which proved to be poly (n-butyl-p-xylylene) was transparent rubbery to the feel, and a crystalline melting point 25° C. An opaque polymer, poly-p-xylylene, formed in the final, air-cooled zone.

EXAMPLE XV

In a 250-ml. three-neck flask equipped with stirrer, calcium chloride tube, and stopper was placed 200 ml. of s-tetrachloroethane, 10.8 grams of anhydrous aluminum chloride, and 13 grams of benzoyl chloride. Stirring was commenced and the flask immersed in a Dry Ice acetone bath at −20° C. to −25° C. 10.8 grams of di-p-xylylene was added in one portion and the mixture stirred at −20° C. to −25° C. for one hour. The catalyst was then decomposed by addition of 100 ml. of 1 N hydrochloric acid. The organic layer was separated and washed successively with 100 ml. of water, 100 ml. of 5 percent sodium bicarbonate solution, and 100 ml. of water. The organic layer was dried and the solvent removed by vacuum distillation. The product was distilled through a short path column and had a boiling point of 200° C.–215° C. at 0.3 mm. The product was triturated with ether, and the ether solution filtered to recover a small amount of unreacted di-p-xylylene. On evaporation of the ether a total of 12.08 grams (78 percent yield) of benzoyl-di-p-xylylene, M.P. 118° C.–120° C. was obtained. After recrystallization from methanol the material had a melting point of 122° C.–123° C. The reaction can be represented by the following scheme:

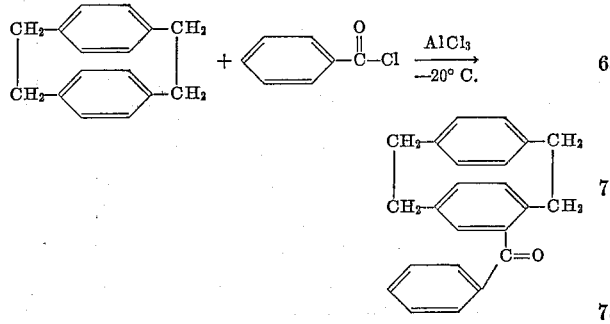

Pyrolysis of the 2-benzoyl-di-p-xylylene at a temperature of 550° C.–600° C. as described in Example I yields the diradicals, 2-benzoyl-p-xylylene and p-xylylene which condensed into poly-2-benzoyl-p-xylylene and poly-p-xylylene according to the following scheme:

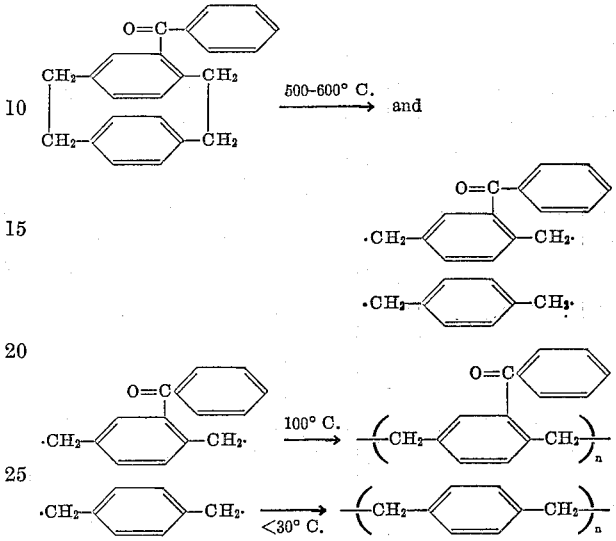

However, if desired, the 2-benzoyl-di-p-xylylene can itself be employed as an intermediate, for example, by reduction to 2-benzyl-di-p-xylylene according to the following scheme and procedure:

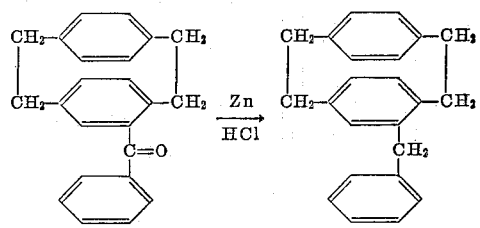

In a 250 ml. flask was placed 10 grams of amalgamated zinc, 100 ml. of glacial acetic acid, 2.5 grams of benzoyl-di-p-xylylene, and 15 ml. of concentrated hydrochloric acid. The solution was heated to reflux and resaturated with anhydrous hydrogen chloride at the end of every hour for a total of six hours. The mixture was then heated to reflux overnight. The liquid products were transferred into a separatory funnel and the organic products extracted into 100 ml. of benzene. The benzene layer was separated, washed and dried. The benzene was removed by atmospheric distillation and the product purified by vacuum distillation. The product had a boiling point of 180° C.–200° C. at 0.3 mm. and was recrystallized from aqueous ethanol. A total of 0.55 gram of pure 2-benzyl-di-p-xylylene, M.P. 135° C.–136° C. was obtained.

Pyrolysis of the 2-benzyl-di-p-xylylene yields the diradicals, 2-benzyl-p-xylylene and p-xylylene according to the following scheme:

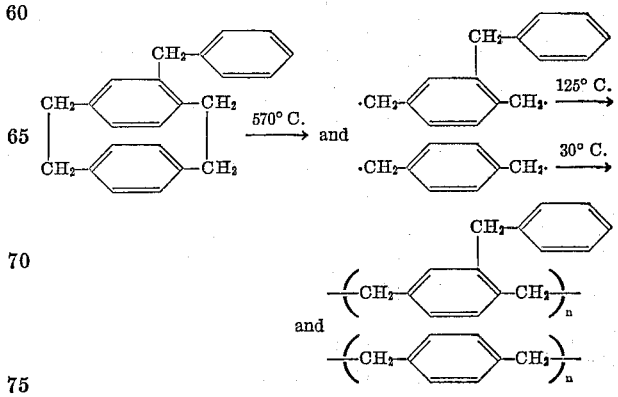

The polymerization was carried out in 17 mm. Pyrex tubing. An eighteen-inch pyrolysis zone and a fifteen inch polymerization zone were employed. A total of 1.7 grams of benzyl-di-p-xylylene was pyrolyzed at a steady rate at 600° C. and 0.2 mm. pressure over a twenty-four minute period. The initial polymerization zone was maintained at 125° C. Polymer A was isolated from this zone. A total of 0.5 gram of polymer A was obtained after ether extraction. This polymer proved to be poly (benzyl-p-xylylene) exhibited a R.V. of 0.73 in chloroform at 25° C., and possessed a crystalline melting point of 125° C. A total of 0.53 gram of poly-p-xylylene was obtained from the final air-cooled polymerization zone.

The poly-p-xylylene prepared by this method are all linear, thermoplastic polymers with no evidence of cross-linking. Crystalline melting point of these polymers are relatively distinct and depends to a great extent on the presence of particular substituent groups.

The following properties are characteristic for the polymers having the structure

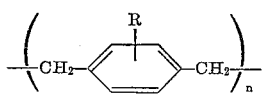

| R | Crystalline Melting Point, °C. | Solubility, Complete Dissolution | |
|---|---|---|---|
| | | Solvent | Temp., °C. |
| —H | 400 | Chlorinated biphenyl | 250 |
| —Cl | 270–280 | α-methyl naphthalene | 160 |
| —Cl₂ | 310–330 | ——do—— | 160 |
| —Cl₃ | 310–330 | ——do—— | 160 |
| —Br | 245–255 | ——do—— | 160 |
| —C₂H₅ | 180 | s-Tetrachloroethane | 150 |
| —C₃H₇ | 180–185 | ——do—— | 150 |
| —C₄H₉ | 25 | Chloroform | 25 |
| —C(O)—CH₃ | 190–195 | α-Chloronaphthalene | 100 |
| —C(O)—C₂H₅ | 165–170 | s-Tetrachloroethane | |
| —C(O)—C₃H₇ | 100 | Chloroform | 25 |
| —C(O)—C₆H₅ | | s-Tetrachloroethane | |
| —C(O)—OCH₃ | 200–210 | ——do—— | 150 |
| —C(O)—NH₂ | | | |
| —C≡N | 210 | α-Chloronaphthalene | 200 |
| —C≡CH | | ——do—— | |
| —CH₂C₆H₅ | 125 | Chloroform | 25 |
| —CH(OH)CH₃ | | | |

By techniques some of which are illustrated above, it is possible to insert on the aromatic nuclei of the starting di-p-xylylene any group which can normally be substituted on an aromatic nuclei. Polyalkyl substituted di-p-xylylene are prepared for instance by repetitive acylation and reduction reactions or by direct alkylation as more fully set forth in my United States Patent 3,117,168 entitled, "Alkylated Di-p-Xylylenes," and polyhalogenated di-p-xylylenes are prepared as illustrated above and more specifically covered in my United States Patent 3,221,068 entitled, "Halogenated Di-p-Xylylenes."

Other substituents normally substitutable on an aromatic nuclei can be prepared by other reactions similar to those wherein aromatic substitution occurs. For instance, nitro-di-p-xylylene is prepared by the method described by Cram et al. J. Am. Chem. Soc., vol. 77, No. 23, 6289 (1955) by dissolving di-p-xylylene in boiling acetic acid which is then nitrated at 70° C. with fuming nitric acid with constant agitation. After purification the nitro-di-p-xylylene had a melting point of 155.5°–156.5° C. The nitro substituted di-xylylene is readily pyrolyzed as hereinabove described and condensed into two homo-polymers, poly (p-xylylene) and poly (2-nitro-p-xylylene).

However, by using the nitro-di-p-xylylene as a starting material, the amino-di-p-xylylene can be prepared by reducing the nitro group with hydrogen over a platinum oxide catalyst in a solvent such as methanol. The amino-di-p-xylylene has a melting point of about 239°–241° C. and can also be pyrolyzed into two reactive diradicals, which can be separately condensed into homopolymers of p-xylylene and amino-p-xylylene.

Further the acetamido-di-p-xylylene can be prepared from amino-di-xylylene by use of acetic acid or acetic anhydride. The acetamido-di-p-xylylene has a melting point of 208°–210° C. and can be pyrolyzed in the same manner into the homopolymer.

Demonstration of the linearity of these polymers is relatively simple. When a sample of poly-p-xylylene prepared by this invention is placed in chlorinated biphenyl solvent at 270° C., the polymer dissolved in one minute. On cooling to 200° C., the polymer crystallizes from solution in the form of a gel which upon heating to 270° C. again, forms a free flowing solution of polymer. The reduced viscosity of the polymer (at 0.2 percent concentration in this solvent) remained at 0.15.

In contrast to this, the poly-p-xylylene prepared from p-xylene by the Szwarc process was swelled but not dissolved after one hour at 270° C. Since the polymer did not dissolve, measurement of the reduced viscosity of this polymer could not be made.

In addition to this, it is observed that cross-linked poly-p-xylylene at above 400° C. becomes a transparent rubbery material but retains its shape, whereas the linear poly-p-xylylenes at above 400° C. not only becomes transparent, but also melts and loses its shape.

Substituent groups on the aromatic nuclei also provide evidence of the cross-linking of the high temperature polymerized products. For example, a sample of a poly (chloro-p-xylylene)

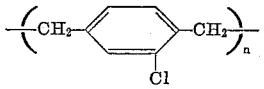

was prepared from dichloro-di-p-xylylene by the process described heretofore in Example I. This polymer proved to be homogeneous and exhibited the following elemental analysis.—Found: C, 69.5%; H, 5.4%; Cl, 25.5%. Theoretical: C, 69.3% H, 5.1%; Cl, 25.6%.

The product exhibited the correct elemental analysis for a linear poly (chloro-p-xylylene). The polymer was readily and completely soluble in α-chlorophthalene at 170% C. and exhibited an R.V. of 1.14 in this solvent at 150° C.

A poly (chloro-p-xylylene) was also prepared by pyrolysis of 2-chloro-p-xylene, utilizing the original Szwarc procedure at 850° C. in this experiment a non-homogeneous chlorinated polymer was obtained. The chlorine analysis of various segments of this sample ranged from 21.9 to 24.8 percent chlorine instead of the theoretical value of 25.6 percent. The complete elemental analysis of two portions of this polymer was as follows.—Found: (Sample A): C, 70.2%; H, 5.5%; Cl 24.8%. (Sample B): C, 70.4%; H, 4.9%; Cl 22.9%. Theoretical: C, 69.3%; H, 5.1%; Cl, 25.6%.

The polymers of low chlorine content (21–23%) were completely insoluble on heating for six hours in α-chloronaphthalene at 250° C. The sample containing 24.8 percent chlorine was slightly soluble in α-chloronaphthalene after heating at 250° C. for about several minutes. However, even this sample exhibited incomplete solubility. It is evident on the basis of the elemental analytical data and the solubility data that the Szwarc process yields cross-linked poly (chloro-p-xylylene). The elemental analytical data clearly indicate the cleavage of chlorine atoms from the aromatic nuclei. This undoubtedly results in trifunctional species which yield, finally, cross-linked structures as indicated in the following formula:

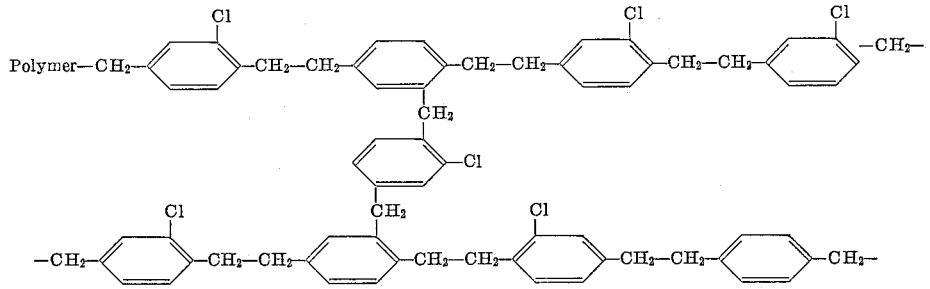

Such cross-linking, of course, yields insoluble and thermally untractable polymers.

As a second example of the differences in polymers obtained by the two routes, attempts to prepare poly (acetyl-p-xylylene)

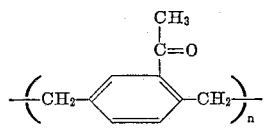

by both the di-p-xylylene and the original Szwarc procedure have been carried out. Poly (acetyl-p-xylylene) was prepared from acetyl-di-p-xylylene by the procedure described in Example IV. The polymer exhibited the following elemental analysis.—Found: C, 81.9%; H, 7.1%; O (by diff.) 11.0%. Theoretical: C, 82.2%; H, 6.9%; O (by diff.) 10.9%.

The polymer was readily soluble in α-chloronaphthalene and exhibited an R.V. of 1.0 in this solvent at 150° C. The infra-red spectrum of the polymer exhibited a strong carbonyl band at 5.9. All of the analytical evidence is completely consistent with the proposed structure of a linear polymer.

An attempt was also made to prepare poly (acetyl-1-xylylene) from 2,5-dimethylacetophenone by pyrolysis at 900° C. utilizing the original Szwarc procedure. Considerable degradation occurred and only a 1 percent yield of polymer was obtained. The polymer possessed the following elemental analysis.—Found: C, 89.4%; H, 7.3%; O (by diff.) 3.3%. Theoretical: C, 82.2%; H, 6.9%; O (by diff.) 10.9%.

The infra-red spectrum of this polymer exhibited a very weak carbonyl band at 5.9. The infra-red and elemental analytical evidence clearly indicate that Szwarc pyrolysis of 2,5-dimethylacetophenone resulted in substantial cleavage of the acetyl groupings and in a polymer other than linear poly (acetyl-p-xylylene) as represented above.

There are substantial differences in the infra-red spectra of poly (chloro-p-xylylenes) prepared by the two processes. In particular, the spectra of the polymer of this invention has strong bands at 9.35 and 12.75 microns, but are absent from the spectra of the polymer made by the Szwarc process. These differences are undoubtedly related to the cross-linking and cleavage of chlorine atoms from the Szwarc polymer.

Further, the difference in the polymer obtained by the two processes is detectible in the quality of the product produced. The linear products of this invention are clear or white polymers of excellent quality, color and uniformity. In contrast, polymers made by high temperature pyrolysis are most often colored to some degree, and are non-uniform in characteristics and quality.

As discussed heretofore, several methods have been found to control the molecular weight of the polymers, as determined by the reduced viscosity. While it has been possible to prepare products having reduced viscosities (0.2 percent concentration in α-chloronaphthalene) from 0.1 to 5 or more, those products having a reduced viscosity from 0.4 to 1.0 appear desirable for most applications and are thus preferred. Actual molecular weight, i.e., the number of repeating units or particular p-xylylene in the polymer chain, has been difficult to determine, however it can range from 10 to 10,000 with the most desirable polymers being those averaging from 100 to 5000 units in the chain.

These polymers are readily employed in solution or melt forming applications and are particularly desirable in film, fibers, surface coatings, electrical insulation and other similar applications, particularly where high resistance to thermal and chemical deterioration is necessary.

I claim:

1. A method for the preparation of linear homopolymers of p-xylylenes comprising the steps of heating a cyclo-di-p-xylylene having up to about 6 aromatic nuclear substituent groups selected from the class consisting of hydrocarbon, oxyhydrocarbon, thiohydrocarbon, hydroxyl, halogen, nitro, nitrile, amine and mercapto groups to a temperature between about 450° C. and 700° C. for a time sufficient to cleave substantially all of the di-p-xylylene into vaporous p-xylylene diradicals but insufficient to further degrade the said diradicals and at a pressure such that the partial pressure of the vaporous p-xylylene diradicals is below about 0.75 mm. Hg, and cooling the vaporous diradicals to a temperature below 200° C. and below the ceiling condensation temperature of only one p-xylylene diradical specie present in the pyrolysis vapors thereby condensing said diradical and forming a linear homopolymer of p-xylylene.

2. The method defined in claim 1 wherein the pyrolysis is conducted at a temperature between 550° C. and 600° C.

3. The method defined in claim 1 wherein the pyrolysis is conducted at a system pressure of between about 0.0001 and 10 mm. Hg pressure.

4. The method defined in claim 1 wherein an inert vaporous diluent is employed in the pyrolysis.

5. The method defined in claim 1 wherein the condensation of the diradicals is conducted in the presence of a free radical chain transfer agent.

6. The method defined in claim 1 wherein the partial pressure of the p-xylylene diradical is maintained below about 0.5 mm. Hg.

7. The method defined in claim 1 wherein a second diradical specie present in the pyrolysis vapors is condensed in a second cooling and condensation zone maintained at a lower temperature than the first cooling and condensation zone.

8. The method defined in claim 1 wherein the diradical vapors are cooled and condensed on a cool substrate surface thereby coating said substrate surface with the poly-p-xylylene.

9. A linear solid thermoplastic homo-polymerization product of the condensed diradicals of the pyrolysis of a cyclo-di-p-xylylene containing from one to six aromatic nuclear substituent groups selected from the class consisting of hydrocarbon, oxyhydrocarbon, thiohydrocarbon, hydroxyl, halogen, nitro, nitrile, amine and mercapto groups, said pyrolysis being at a temperature between about 450° C. and about 700° C. and at a diradical partial pressure below about 0.75 mm. Hg, said polymerization product characterized by being free of cross-linking, having complete solvent solubility without molecular degradation and having a sharp crystalline melting point.

10. A linear solid thermoplastic homopolymerization product of the condensed diradicals of the pyrolysis of a cyclo-di-p-xylylene of the structure:

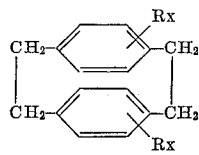

wherein R is a group selected from the class consisting of hydrocarbon, oxyhydrocarbon, thiohydrocarbon, hydroxyl, halogen, nitro, nitrile, amine and mercapto groups, and $x$ is an integer from 1 to 3 inclusive, said pyrolysis being at a temperature between about 450° C. and about 700° C. and at a diradical partial pressure below about 0.75 mm. Hg, said product characterized by being free of cross-linking, having complete solvent solubility without molecular degradation and having a sharp crystalline melting point.

11. A linear thermoplastic homopolymer as defined in claim 10 wherein the R group is an acyl group.

12. A linear thermoplastic homopolymer as defined in claim 10 wherein the R group is an alkyl group.

13. A linear thermoplastic homopolymer as defined in claim 10 wherein the R group is a halogen group.

14. A linear thermoplastic homopolymer as defined in claim 13 wherein the halogen is chlorine.

15. A linear thermoplastic homopolymer as defined in claim 13 wherein the halogen is bromine.

16. As a new composition of matter, a linear thermoplastic solid polymerization product of the condensed diradicals of the pyrolysis of cyclo dichloro-di-p-xylylene, said pyrolysis being at a temperature between about 450° C. and about 700° C. and at a diradical partial pressure below about 0.75 mm. Hg, said polymerization product having a crystalline melting point of about 270° C.–280° C. and characterized by being completely soluble in refluxing α-methyl naphthalene in an inert atmosphere without molecular degradation.

17. As a new composition of matter, a linear thermoplastic solid polymerization product of the condensed diradicals of the pyrolysis of cyclo tetrachloro-di-p-xylylene, said pyrolysis being at a temperature between about 450° C. and about 700° C. and at a diradical partial pressure below about 0.75 mm. Hg, said polymerization product having a crystalline melting point of about 310°–330° C. and characterized by being completely soluble in refluxing α-methyl naphthalene in an inert atmosphere without molecular degradation.

18. As a new composition of matter, a linear thermoplastic solid polymerization product of the condensed diradicals of the pyrolysis of cyclo dibromo-di-p-xylylene, said pyrolysis being at a temperature between about 450° C. and about 700° C. and at a diradical partial pressure below about 0.75 mm. Hg, said polymerization product having a crystalline melting point of about 245°–255° C. and characterized by being completely soluble in refluxing α-methyl naphthalene in an inert atmosphere without molecular degradation.

19. As a new composition of matter, a linear thermoplastic solid polymerization product of the condensed diradicals of the pyrolysis of cyclo diethyl-di-p-xylylene, said pyrolysis being at a temperature between about 450° C. and about 700° C. and at a diradical partial pressure below about 0.75 mm. Hg, said polymerization product having a crystalline melting point of about 180° C. and characterized by being completely soluble in tetrachlorethane in an inert atmosphere without molecular degradation.

20. As a new composition of matter, a linear thermoplastic solid polymerization product of the condensed diradicals of the pyrolysis of cyclo diacetyl-di-p-xylylene, said pyrolysis being at a temperature between about 450° C. and about 700° C. and at a diradical partial pressure below about 0.75 mm. Hg, said polymerization product having a crystalline melting point of about 190°–195° C. and characterized by being completely soluble in α-chloro naphthalene in an inert atmosphere without molecular degradation.

21. As a new article of manufacture, a substrate having an intimate coating on at least a portion thereof of the polymeric product of claim 9.

22. The article of manufacture of claim 21 wherein the coating substantially completely covers the substrate surface.

23. The article of manufacture of claim 21 wherein the coating is only on a portion of the substrate surface.

References Cited

UNITED STATES PATENTS

| | | |
|---|---|---|
| 2,719,131 | 9/1955 | Hall. |
| 2,769,786 | 11/1956 | Szwarc et al. _____ 260—2 |
| 2,914,489 | 11/1959 | Hall. |
| 2,999,820 | 9/1961 | Young _____ 260—2 |
| 3,087,916 | 4/1963 | Landrum et al. _____ 260—2 |

FOREIGN PATENTS

| | | |
|---|---|---|
| 673,651 | 6/1952 | Great Britain. |

OTHER REFERENCES

Brown et al.: "Jour. Chem. Soc.," London, October 1953 pp. 3270–3278.

Gorham: German application No. 1,085,673, printed July 1960.

Schaefgen: "Jour. Polymer Science," vol. 15, January 1955, pp. 203–219.

Brown et al.: Nature, vol. 164, pp. 915–6 (1949).

Cram et al.: Journal of American Chemical Society, vol. 73, pp. 5691–5704 (1951).

Cram et al.: Journal of American Chemical Society, vol. 77, pp. 6289–6294 (1955).

Auspos et al.: Journal Polymer Science, vol. 15, pp. 19–29 (1955).

Zimm et al.: Journal Polymer Science, vol. 9, pp. 476–8 (1953).

SAMUEL H. BLECH, *Primary Examiner.*

UNITED STATES PATENT OFFICE
CERTIFICATE OF CORRECTION

Patent No. 3,342,754                                         September 19, 1967

William F. Gorham

It is hereby certified that error appears in the above numbered patent requiring correction and that the said Letters Patent should read as corrected below.

Column 8, lines 16 to 19, for the right-hand portion of the formula reading "-CH-" read -- $-CH_2-$ --; column 9, line 20, for "p. > 400° C." read -- m.p. > 400° C. --; column 12, line 74, for "mercaptons" read -- mercaptans --; column 14, lines 20 to 25, for the lower right-hand portion of the formula reading line 42, for "26-30° C." read -- 25-30° C. --; line 49, for "2-butyryl-di-xylylene" read -- 2-butyryl-di-p-xylylene --; column 18, line 57, for "in" read -- In --.

Signed and sealed this 17th day of December 1968.

(SEAL)
Attest:

EDWARD M. FLETCHER, JR.                        EDWARD J. BRENNER
Attesting Officer                                Commissioner of Patents